US007699702B2

(12) United States Patent
Daniel

(10) Patent No.: US 7,699,702 B2
(45) Date of Patent: Apr. 20, 2010

(54) COLLUSION DETECTION

(75) Inventor: David A. Daniel, Rio de Janeiro (BR)

(73) Assignee: Waterleaf Limited, Douglas, Isle of Man (GB)

( * ) Notice: Subject to any disclaimer, the term of this patent is extended or adjusted under 35 U.S.C. 154(b) by 1130 days.

(21) Appl. No.: 10/544,922

(22) PCT Filed: Feb. 11, 2004

(86) PCT No.: PCT/IB2004/001048

§ 371 (c)(1),
(2), (4) Date: Jan. 17, 2006

(87) PCT Pub. No.: WO2004/071601

PCT Pub. Date: Aug. 26, 2004

(65) Prior Publication Data

US 2006/0121968 A1 Jun. 8, 2006

(30) Foreign Application Priority Data

Feb. 11, 2003 (GB) ................................ 0303053.3

(51) Int. Cl.
*G06F 17/00* (2006.01)

(52) U.S. Cl. ........................................................ 463/29

(58) Field of Classification Search ............. 463/16–25, 463/29, 30, 42; 379/145; 705/1
See application file for complete search history.

(56) References Cited

U.S. PATENT DOCUMENTS 4,926,327 A 5/1990 Sidley (Continued)

FOREIGN PATENT DOCUMENTS

WO 00/62880 A2 10/2000

(Continued)

OTHER PUBLICATIONS

Supplementary European Search Report, dated Apr. 25, 2007, from related application No. EP04710109.

(Continued)

*Primary Examiner*—Ronald Laneau
(74) *Attorney, Agent, or Firm*—McDonnell Boehnen Hulbert & Berghoff LLP

(57) ABSTRACT

A system for detecting collusion in a game having a plurality of participating players comprises means for recording, for each player, an amount wagered on each turn of the game in which the player participates, and a corresponding outcome of said wager, the outcome being a complete or partial forfeit of the wager if the wager is unsuccessful, and a profit made on the wager if the wager is successful; a ranking facility operable to derive a tertiary statistic for each pair of participating players, the tertiary statistic being a function of the cumulative wagers by each player in the pair in all turns of the game in which both players have wagered, and the cumulative outcomes of the wagers made by each player in the same turns of the game; and monitoring means for monitoring the tertiary statistic of each pair of players and generating an output when the tertiary statistic exceeds a predetermined threshold, the output being an indicator of possible collusion by the respective pair of players.

16 Claims, 2 Drawing Sheets

U.S. PATENT DOCUMENTS

| | | | | |
|---|---|---|---|---|
| 5,819,226 | A * | 10/1998 | Gopinathan et al. | 705/44 |
| 6,104,815 | A | 8/2000 | Alcorn et al. | |
| 6,516,056 | B1 * | 2/2003 | Justice et al. | 379/145 |
| 7,556,561 | B2 * | 7/2009 | White et al. | 463/13 |
| 7,604,541 | B2 * | 10/2009 | Aikin et al. | 463/42 |
| 2002/0103029 | A1 | 8/2002 | Finlayson et al. | |
| 2003/0097330 | A1 * | 5/2003 | Hillmer et al. | 705/38 |
| 2004/0242321 | A1 * | 12/2004 | Overton | 463/29 |
| 2006/0068870 | A1 * | 3/2006 | Crawford et al. | 463/13 |
| 2006/0068871 | A1 * | 3/2006 | Crawford et al. | 463/13 |
| 2008/0004107 | A1 * | 1/2008 | Nguyen et al. | 463/29 |
| 2008/0182644 | A1 * | 7/2008 | Lutnick et al. | 463/20 |
| 2009/0029766 | A1 * | 1/2009 | Lutnick et al. | 463/29 |
| 2009/0093300 | A1 * | 4/2009 | Lutnick et al. | 463/26 |

FOREIGN PATENT DOCUMENTS

| | | | |
|---|---|---|---|
| WO | 03/007254 | A2 | 1/2003 |

OTHER PUBLICATIONS

International Preliminary Report on Patentability, dated Mar. 30, 2006, from International Application No. PCT/IB04/01048.

* cited by examiner

COLLUSION DETECTION

FIELD OF INVENTION

This invention relates to a system for detecting and controlling collusion in a game, more specifically a zero-sum game and, in particular, to a system for detecting and controlling collusion in a game on which wagers may be placed such as, for example, multiplayer poker. The invention extends to a method for detecting and controlling collusion in a game.

BACKGROUND TO THE INVENTION

The invention will be described with particular reference to the detection and control of collusion in a game of multiplayer poker. It is to be clearly understood, however, that the scope of the invention is not limited to the detection and control of collusion in this particular game.

The game of poker is widely played in many jurisdictions, particularly in the United States of America. A traditional game of poker is a multi-player game in which, during each turn of the game, the players compete against each other to win an accumulated jackpot ("the pot"), to which all the players have contributed to some extent by means of wagers. It is clear that the game is a zero-sum game, as the gain of the winner of the pot is equal to the accumulated losses of the other players in the game. It is, however, also known for a party who arranges or hosts a game of poker to levy a commission ("a rake") on the pot in order to derive revenue.

The game of poker is played at both land-based and on-line casinos, at the latter by means of a communication network such as the Internet.

Although there are many variations of the game of poker, the basic aim of the game is for each player to assemble five playing cards ("a hand") from a deck of cards and to wager that their hand will outrank those of the other players, according to predetermined criteria. Once the players' hands have been assembled and wagers placed, the respective hands are compared ("the show down") in order to determine the winning player, who wins the pot.

The winner is usually the player whose hand contains a highest-ranking desirable combination of five playing cards. The desirability of any combination of five playing cards in a hand is inversely proportional to the probability of assembling that particular combination of cards. Desirable combinations of playing cards are, given a standard deck of 52 playing cards, in order of increasing desirability: a pair of cards having the same rank ("one pair"); two pairs of cards in which the rank of each pair is different ("two pairs"); three cards having the same rank ("three of a kind"); "a straight" in which the five cards of a hand are in sequentially increasing rank order, with no restriction as to suite, "a flush" in which the five cards are all of the same suite; "a full house" in which three cards are each of the same rank, while the remaining two cards each have another identical rank; "four of a kind" in which four cards of the hand each have the same rank; "a straight flush" in which the five cards are in sequentially ascending rank order and are all of the same suite; and a "royal flush" in which the five cards are all of the same suite and are ranked Ace, King, Queen, Jack and 10. Where a deck is used that has fewer than 52 cards, the probability of assembling a full house is greater than that of being dealt a flush, making the latter combination of cards more desirable than the former.

The placement of wagers is achieved by one or more rounds of betting during the course of a turn of the game. The first player to act in a betting round can place a wager ("to bet"), withdraw from the turn of the game ("to fold"), or do nothing, merely passing the opportunity on to the next player ("to check"). After an initial bet, if there is one, the rest of the players, in turn, have the choices of increasing the size of the wager ("to raise"), folding, or matching the size of the previous wager ("to call"). A round of betting is completed when all the players who have not folded, and who will be referred to, for convenience, as the surviving players, have contributed the same amount to the pot. Any player who decides to fold does not participate any further in the particular turn of the game and forfeits all wagers he has made in that turn. To keep betting rounds from continuing indefinitely, it is customary for there to be at most three raises per betting round.

In each turn of the game, one player assumes the role of dealer of the playing cards. Betting is always done in a clockwise order. The first player to act is the one immediately clockwise of the dealer. Consequently, the dealer is the last to bet and, having seen the actions of the other players in the betting round, has access to the most information and is in a stronger position to the other players. For reasons of equity, the role of dealer passes to the next player in a clockwise direction after each turn of the game. When the game of poker is played in an on-line environment, the role of dealer is a symbolic one as dealing of cards is performed under software program control.

The size of bets or raises is determined by the rules of the game. A game of poker is characterised by the sizes of permissible bets. During the first two betting rounds, all bets and raises must be of a predetermined size ("the minimum bet") and must be of another, but greater, predetermined size ("the maximum bet") during the remaining betting rounds. Typically, the maximum bet is twice the minimum bet. A game in which the minimum bet is $5 and the maximum bet is $10 is characterised as a $5/$10 game.

At the start of a turn of the game, one or more players immediately clockwise of the dealer may be required to make bets ("blinds") without having seen any cards, in order to ensure that there is always something in the pot. As an alternative, each player may be required to make an initial wager of a predetermined size ("an ante").

It will be appreciated that the game of poker is a mixed game, combining elements of both chance and skill or strategy. It is known for two or more players in a poker game to co-ordinate their respective playing strategies in order to gain an advantage over the remaining players in the game, thereby destroying the fairness of the game.

Most variations of the game of poker fall into two main classes, namely draw poker and stud poker. In stud poker, one or more cards dealt to each player is visible to the other players in the game, while in draw poker, the cards in a players' hand are only revealed at the showdown stage of the game. Stud games also tend to have more betting rounds than draw poker, resulting in larger pots.

Within these two main classes, there are other variations that relate, mainly to the steps by which a player may assemble five playing cards in order to obtain the highest possible ranking hand. It will be further appreciated that the detection of collusion in a game of poker will depend, in part, upon the particular variation of the game being played. For the sake of clarity, the sequential steps relating to a number of the most popular variations of the game will be outlined below.

a) 5 Card Draw

1. Each player is dealt five cards face down
2. $1^{st}$ Betting round
3. Each player may discard any one or more cards in his hand and draw replacement cards with the goal of improving his hand ("the draw")
4. $2^{nd}$ Betting round
5. Showdown (highest ranking hand wins the pot)

b) 5 Card Stud

1. A first card is dealt face down to each player
2. A second card is dealt face up to each player
3. $1^{st}$ Betting round
4. A third card is dealt face up to each player
5. $2^{nd}$ Betting round
6. A fourth card is dealt face up to each player
7. $3^{rd}$ Betting round
8. A fifth card is dealt face up to each player
9. $4^{th}$ Betting round
10. Showdown (highest ranking hand wins the pot)

c) Texas Hold 'Em

1. A first two cards are dealt face down to each player ("hole cards")
2. $1^{st}$ Betting round
3. A first three community cards are dealt face up ("the flop")
4. $2^{nd}$ Betting round
5. A fourth community card is dealt face up ("the turn")
6. $3^{rd}$ betting round
7. A fifth and final community card is dealt face up ("the river")
8. $4^{th}$ Betting round
9. Showdown (highest ranking hand made up of any combination of a player's two hole cards and the five open community cards)

d) Omaha

1. Four hole cards are dealt face down to each player
2. $1^{st}$ Betting round
3. A first three community cards are dealt face up (the flop)
4. $2^{nd}$ betting round
5. A fourth community card is dealt face up (the turn)
6. $3^{rd}$ Betting round
7. A fifth and final community card is dealt face up (the river)
8. $4^{th}$ Betting round
9. Showdown (highest ranking hand made up of any combination of two hole cards and three open community cards)

e) Omaha Hi/Lo

The procedural rules of this variation of the game of poker are identical to those of the Omaha variation, with the exception that, at the showdown, the pot is split 50/50 between the highest ranking hand made up of any combination of a player's four hole cards and the three open community cards, and a best qualifying low hand. A low hand must be "8 or lower" to qualify. Thus, any hand that contains a 9 or higher cannot qualify as a low hand. The winning qualifying low hand is determined firstly by the player with the lowest high card. Upon a tie, the hand goes to the player with the next lowest high card. If there is no qualifying low hand, the high hand wins the entire pot.

f) 7 Card Stud

1. All players ante
2. Two hole cards are dealt face down to each player
3. A third card is dealt face up to each player ("door card")
4. $1^{st}$ Betting round
5. A fourth card is dealt face up to each player ("Fourth Street")
6. $2^{nd}$ Betting round
7. A fifth card is dealt face up to each player ("Fifth Street")
8. $3^{rd}$ Betting round
9. A sixth card is dealt face up to each player ("Sixth Street")
10. $4^{th}$ Betting round
11. A seventh and last card is dealt face up to each player ("Seventh Street")
12. $5^{th}$ Betting round
13. Showdown (highest ranking hand made up of any combination of five of the player's seven cards On the first round of betting, the low card by suite is required to initiate action with a bet equal to half the lower table limit, the suites being ranked as spades, hearts, diamonds and clubs, from highest to lowest. On subsequent betting rounds, the highest exposed hand to date initiates betting action g) 7 Card Stud Hi/Lo The procedural rules of this variation of the game of poker are identical to those of the 7 Card Stud variation, with the exception that, at the showdown, the pot is split 50/50 between the best high hand and the best qualifying low hand. Each player can use any five cards in his hand for the high hand, and any five cards in his hand for the low hand.

h) Razz

The procedural rules of this variation of the game of poker are identical to those of the 7 Card Stud variation, with the exception that the lowest hand wins the pot. Each player can use any five of the seven cards in his hand for the low hand. Aces are low and straights and flushes have no effect on the value of the hand. The best possible low hand is 5-4-3-2-Ace.

i) Manila (2 card)

This variation of the game of poker is played with a reduced deck of 32 cards (sevens to aces), accommodating a maximum of 11 players.

1. Two hole cards are dealt face down to each player
2. A first community card is dealt face up
3. $1^{st}$ Betting round
4. The next card in the deck is discarded ("burnt")
5. A second community card is dealt face up (Fourth Street)
6. $2^{nd}$ Betting round
7. The next card in the deck is burnt
8. A third community card is dealt face up (Fifth Street)
9. $3^{rd}$ Betting round
10. The next card in the deck is burnt
11. A fourth community card is dealt face up (Sixth Street)
12. $4^{th}$ Betting round
13. The next card in the deck is burnt
14. A fifth community card is dealt face up (Seventh Street)
15. $5^{th}$ Betting round
16. Showdown (highest ranking hand made up of a player's two hole cards and the five open community cards)

A system and method for detecting and controlling collusion in a multiplayer game is disclosed in applicant's co-pending application number PCT/US03/38068, which incorporated herein, in its entirety, by reference. The method includes the steps of continuously deriving, for each participating player, one or more statistics as a function of a total number of turns of the game played by the player and the outcomes of the wagers made by the player in these turns of the game; monitoring the statistics of each player; and, generating an output when any statistic of any player changes by more than a predetermined amount, the output being an indicator of possible collusion by that player.

The player statistics referred to in PCT/US03/38068 are statistics that relate to a single player. The applicant has found that there are instances of collusive play that are more easily detectable by means of more complex statistics.

OBJECT OF THE INVENTION

It is an object of this invention to provide a system and a method for detecting and controlling collusion in a game that will, at least partially, enable any potential prejudice to non-colluding players in the game to be reduced.

SUMMARY OF THE INVENTION

A system for detecting collusion in a game having a plurality of participating players, comprising:

means for recording, for each player, an amount wagered on each turn of the game in which the player participates, and a corresponding outcome of said wager, the outcome being a complete or partial forfeit of the wager if the wager is unsuccessful, and a profit made on the wager if the wager is successful;

a ranking facility operable to derive a tertiary statistic for each pair of participating players, the tertiary statistic being a function of the cumulative wagers by each player in the pair in all turns of the game in which both players have wagered, and the cumulative outcomes of the wagers made by each player in the same turns of the game; and monitoring means for monitoring the tertiary statistic of each pair of players and generating an output when the tertiary statistic exceeds a predetermined threshold, the output being an indicator of possible collusion by the respective pair of players.

Further features of the invention provide for the tertiary statistic to be a ratio of the cumulative outcomes of the wagers of both players in a pair, and the cumulative amounts wagered by both players, and for the predetermined threshold of the tertiary statistic to be about 1,08.

Still further features of the invention provide for the system to include a control facility operable to suspend both players in any pair of players for which the monitoring means has generated an output, from any further participation in the game, for the system to include geo-location means for determining the geographical location of any participating player, the control facility being operable to suspend both players in any pair of players for which the monitoring facility has generated an output and whose geographic locations are substantially identical, from any further participation in the game, alternatively for the control facility to be operable to prevent any pair of players for which the monitoring facility has generated an output and whose geographic locations are substantially identical, from participating in a same instance of the game.

Yet further features of the invention provide for the game to be Five Card Stud poker or Seven Card Stud poker, for the monitoring means to also monitor a playing strategy of each participating player in the game of Five Card Stud poker or Seven Card Stud poker, and to generate an output for any player who calls a final bet in any turn of the game with a hand that does not outrank the exposed cards of any other participating player in that turn of the game.

There is also provided for the system to include a storage means capable of storing the tertiary statistic for each pair of participating players.

The invention extends to a method for detecting collusion in a game having a plurality of participating players, comprising the steps of:

recording, for each player, an amount wagered on each turn of the game in which the player participates, and a corresponding outcome of said wager, the outcome being a complete or partial forfeit of the wager if the wager is unsuccessful, and a profit made on the wager if the wager is successful;

deriving a tertiary statistic for each pair of participating players, the tertiary statistic being a function of the cumulative wagers by each player of the pair in all turns of the game in which both players have wagered, and the cumulative outcomes of the wagers made by each player in the same turns of the game; and monitoring the tertiary statistic of each pair of players and generating an output when the tertiary statistic of any pair of players exceeds a predetermined threshold, the output being an indicator of possible collusion by the respective pair of players.

There is further provided for the tertiary statistic to be derived as a ratio of the cumulative outcomes of all the wagers of both players of a pair of players and the cumulative amounts wagered by both players, for the predetermined threshold of the tertiary statistic to be about 1.08.

There is still further provided for suspending any pair of players in any pair of players for which an output has been generated, from any further participation in the game, for determining the geographic location of any participating player, and suspending both players in any pair of players for which an output has been generated and whose geographic locations are substantially identical, from further participation in the game, and for preventing any pair of players for which an output has been generated and whose geographic locations are substantially identical, from participating in a same instance of the game.

There is yet further provided for the game to be Five Card Stud poker or Seven Card Stud poker, for monitoring a playing strategy of each participating player in the game of Five Card Stud poker or Seven Card Stud poker, and generating an output for any participating player who calls a final bet in any turn of the game with a hand that does not outrank the exposed cards of any other participating player.

There is also provided for storing the tertiary statistic for each pair of participating players on a storage means.

BRIEF DESCRIPTION OF THE DRAWINGS

A preferred embodiment of the invention is described below, by way of example only, and with reference to the accompanying drawings, in which.

DETAILED DESCRIPTION OF THE DRAWINGS

This embodiment of the invention will be described with particular reference to a system for detecting collusion in a game of poker. It is to be clearly understood, however, that the scope of this invention is not limited to this particular application.

Figure 1:
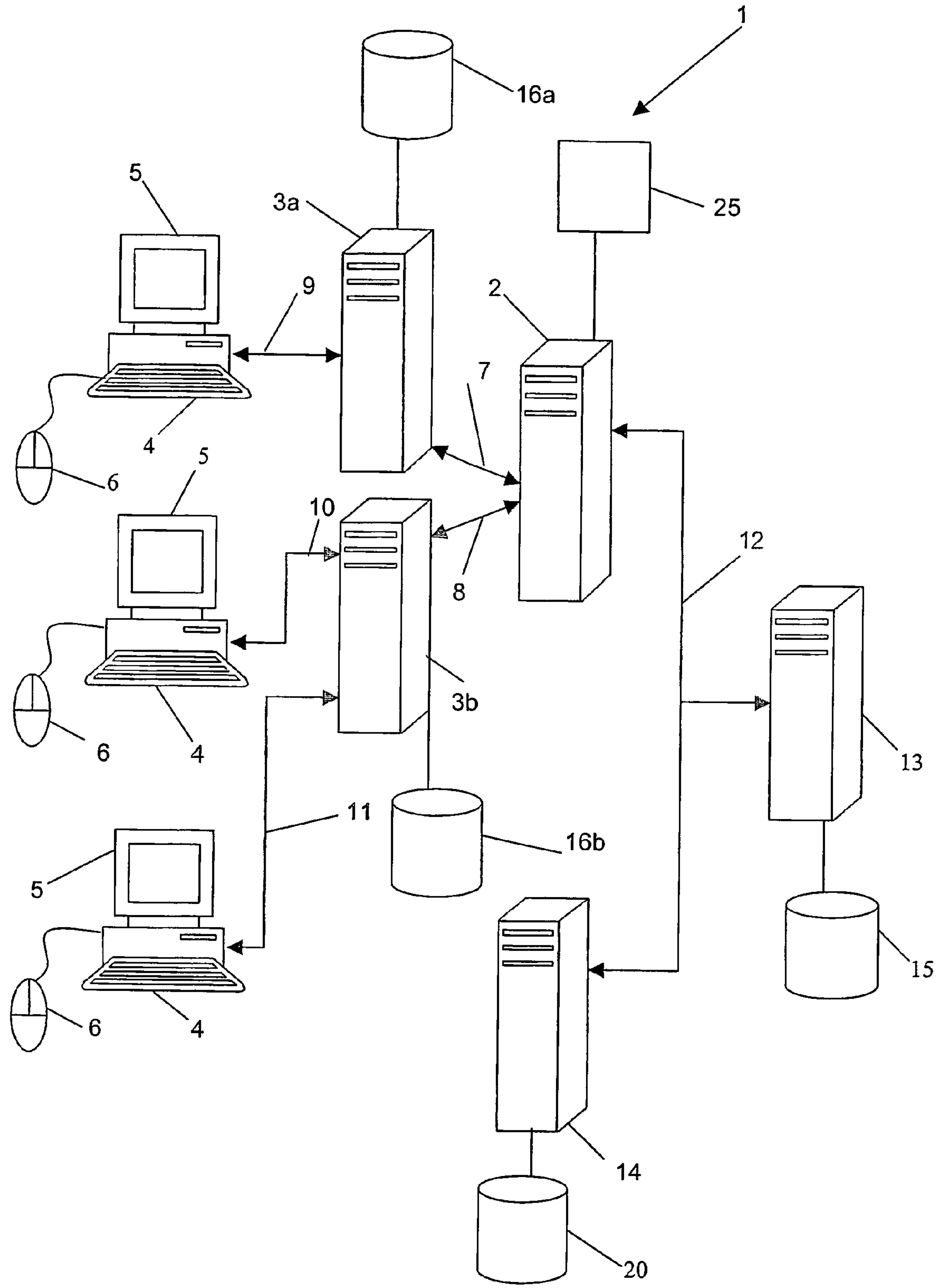
FIG. 1 is a schematic representation of a system for detecting collusion in a game, according to the invention.

Referring to FIG. 1, a system for detecting collusion in a game of poker is indicated generally by reference numeral (1). The system (1) includes a gaming server (2) and a number of portals (3*a*, 3*b*) in the form of websites on the World Wide Web of the Internet. In this embodiment, each one of the portal websites is an online casino website hosted on a corresponding casino web server (not shown). For convenience, this particular embodiment of the invention will be described with particular reference to only two such online casino websites (3*a*, 3*b*). Each one of the casino websites (3*a*, 3*b*) is accessible by one or more would-be poker players (not shown). Each would-be poker player accesses a casino website by means of a corresponding Internet-enabled computer workstation (4) having a display (5) and an associated pointing device (6), such a mouse or, alternatively, a touchpad. In this embodiment, casino website (3*a*) is shown as having one computer workstation (4) logically connected thereto, whereas casino website (3*b*) is shown as being logically connected to two such computer workstations (4). It will be appreciated by those skilled in the art that such online casino websites (3*a*, 3*b*) can be logically connected to any number of computer workstations (4) simultaneously, which number is physically limited only by considerations of processing power and Internet access bandwidth.

The system (1) includes, further an administration facility (13) in the form of an application web server, which is communicable with the gaming server (2) along a communication network (12). The detailed operation of the application web server (13) will be outlined in the description that follows. The system (1) also includes a collusion detection server (14) that is communicable with the gaming server (2) along the communication network (12).

The communication network (12) is, in this embodiment, the Internet. The gaming server (2), the online casino web servers (not shown) corresponding to the online casino websites (3*a*, 3*b*), the computer workstations (4), the application web server (13) and the collusion detection server (14) are all capable of communicating with each other by means of the communication network (12). Although the Internet is a single, packet-switched, open communication network, it represented in FIG. 1, for convenience, as separate logical communication links (7, 8, 9, 10, 11 and 12).

The application web server (13) maintains a clearing account facility (15) that has a clearing account corresponding to each one of the casino websites (3*a*, 3*b*). Analogously, each online casino web server (not shown) includes a corresponding credit account facility (16*a*, 16*b*) with a credit account corresponding to each player who participates in the game of poker through one of the computer workstations (4). In the illustrated embodiment, the credit account facility (16*a*) therefore has one player account associated with it, while credit account facility (16*b*) has two associated player credit accounts.

The gaming server (2) operates under control of a stored program capable of enabling a predetermined maximum number, say 8, of players to participate in an instance of the game of poker. When the number of players reaches this predetermined maximum number, the stored program causes a further instance of the game to be initiated, the new instance also being capable of accommodating a further 8 players. In addition, the stored program initiates different instances of the game for each one of a number of different levels of play that are, in this embodiment, $1/$2, $2/$4, $5/$10, $10/$20, $20/$40, fixed limit games over $20/$40, and pot limit games. In this manner the gaming server is capable, under stored program control, of spawning as many separate instances of the game as required in order to accommodate the requirement of a pool of players who desire to play the game at different levels of play, in groups of a maximum of 8. Each instance of the game spawned in this manner is treated as totally independent of the other instances.

The online casino websites (3*a*, 3*b*) enable a player desiring to join the game to request, by means of one of the computer workstations (4), participation in the game and, once admitted to a particular instance of the game, to place a wager on a turn of that instance. Each participating player is presented with an identical graphical user interface (GUI) on the display (5) of his respective computer workstation (4) by the stored program in the gaming server (2). The GUI presents to the player a suitable display of a poker game (not shown) with appropriate icons that enable the player to make his own desired game play decisions and to monitor the progress of the game by viewing the game play decisions of the other participating players in the same instance of the game.

Figure 2:
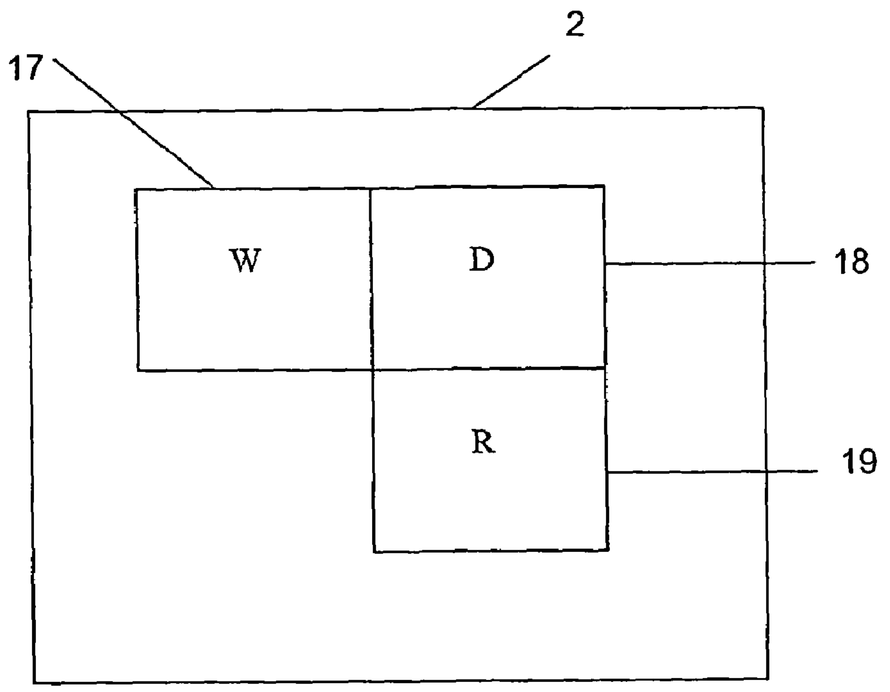
FIG. 2 is a functional representation of a stored software program of the application web server (13) of FIG. 1.

Referring now to FIG. 2, the stored program also provides a wagering means (17) operable by any participating player to place a wager on a turn of the game, as well as a discrimination means (18) capable of determining whether any wager placed by any one of the participating players on the turn of the instance of the game of poker is successful or unsuccessful. The stored program in the gaming server (2) also maintains a dynamic register (19) of all players admitted to, and actively participating in, all the spawned instances of the poker from time to time, together with data representative of a corresponding portal (3*a*, 3*b*) through which each participating player accessed the game. The dynamic register (19) also contains data representative of an instance of the game in which the player is participating. The application web server (13) also settles the wagers of the participating players after completion of every turn of all instances of the game.

In use, a player wishing to participate in the game of poker uses a computer workstation (4) to access an online casino website (3*a*, 3*b*) of his choice. The player is presented with an icon (not shown) on the GUI on his computer workstation (4), which the user can activate in order to request participation in the poker game at a desired level of play. The user's request for participation is passed by the online casino website (3*a*, 3*b*) to the gaming server (2), which adjudicates and processes the request in the following manner:

1. if all existing instances of the poker game at the desired level of play are currently being played by 8 players, the existing instances of the game are all fully occupied and the would-be player cannot be admitted. The user is notified of the situation and is prompted to join a waiting list of would-be players;
2. if any one of the existing instances of the poker game at the desired level of play does have a vacancy, the would-be player is removed from the waiting list and admitted to that instance of the game and an appropriate GUI is presented to the newly-admitted player to allow him to play the game and to place wagers thereon;
3. the register of active participating players is updated to include the details of the newly-admitted player, together with data representative of the online casino website (3*a* or 3*b*) from which the player was admitted to the game, as well as the particular instance of the game to which he has been admitted;
4. when the waiting list of would-be players at any particular level of play has grown sufficiently large, say 4 or 5, the gaming server spawns a new instance of the game at that level of play to accommodate the would-be players in the waiting list, and the list is flushed; and
5. the register of active participating players is updated to include the details of all the newly-admitted players in the newly-spawned instance of the game, together with data representative of an online casino website (3*a* or 3*b*) from which the players were admitted to the game, as well as the particular instance of the game to which the players have been admitted.

Any player is able to leave the instance of the poker game in which he is participating at any time upon completion of a turn of that instance of the game. When a participating player leaves an instance of the poker game, the player's departure results in the following actions:

1. the GUI corresponding to the poker game on the computer workstation is replaced by one allowing the player to select another casino game to play;
2. the departing player's details are removed from the register of active participating players; and
3. the remaining instances of the game are analysed in order to collapse any sparsely populated instances of the game and to consolidate the participating players in these instances into a single more densely-populated instance of the game.

The participating players in any instance of the game utilise the wagering means (17) to place wagers from time to time on a turn of the poker game and to effect playing decisions required during the progress of the turn, as described above. Once the turn of the game has been completed, the discrimination means (18) determines which of the players is the winner of the turn and the application web server (13) settles the wagers placed by the participating players on that turn of the instance of the game, as follows:

1. the gaming server (2) notifies an online casino website (3*a*, 3*b*) associated with each player who has made a wager on the turn of the game. Each online casino website (3*a*, 3*b*) then debits the individual credit account of its associated player by an amount equivalent to the magnitude of that player's wager;
2. the clearing account of an online casino website (3*a*, 3*b*) associated with each player who has made a wager on the turn of the game is then debited by an amount equivalent to the magnitude of that player's corresponding wager;
3. the clearing account of an online casino website (3*a*, 3*b*) associated with the player who has made the successful wager on the turn of the game is credited by an amount equivalent to the total of all the wagers inclusive of the successful wager; and
4. the gaming server (2) also notifies the online casino website (3*a*, 3*b*) associated with the successful player and that online casino website credits the individual credit account of the successful player by an amount equivalent to the total of all the wagers inclusive of the successful wager.

It is anticipated that the wagers placed by the participating players in the game will be made with credit purchased by such players prior to their participation in the game. For this purpose each online casino (3*a*, 3*b*) includes credit dispensing means (not shown) capable of dispensing credit to any player who wishes to participate in the poker game. The player may purchase credit by means of conventional credit or debit card payment facilities that are well known in the art and that will not be described here in detail. Whenever a player purchases credit from the credit dispensing means, the corresponding online casino (3*a*, 3*b*) credits that player's credit account with an amount equivalent to the quantity of credit purchased by the player.

The above embodiment of the invention does not provide any compensation for an operator of the gaming server (2) who provides the participating players with a facility to play the poker game, or for the online casino websites (3*a*, 3*b*) that make their players available to the gaming server (2) for establishment of the poker game. In a variation of the above embodiment, the application server (13) withholds a portion of the total of all the wagers on each turn of the game as a rake for the benefit of the operator of the gaming server (2) and the online casino websites (3*a*, 3*b*). A portion of the rake is credited to the clearing account of each of the online casinos (3*a*, 3*b*) as a function of the proportion of players participating in the turn of the instance of the game through that particular casino website. In this variation of the embodiment, the clearing account of the casino (3*a* or 3*b*) associated with the player who has made a successful wager on the turn of the game is credited with an amount equivalent to the total of all the wagers inclusive of the successful wager, less the amount of the rake. Analogously, the credit account of the player who has made the successful wager is credited by an amount equivalent to the total of all the wagers, inclusive of the successful wager, less the rake.

The collusion detection server (14) maintains a recording means in the form of a collusion detection database (20), the function of which will be described in greater detail below. The collusion detection server (14) operates under control of a stored program capable of logging the playing history of each player who participates an instance of the game of poker at some time. The playing history includes an amount wagered on each turn of the game in which the player has participated, as well as a corresponding outcome of the wager. The outcome of the wager is taken to be a profit made on the wager, if successful, and an amount of the wager that is forfeited by the player if the wager is unsuccessful. In this particular embodiment, the outcome of the successful wager is thus the total of all the wagers by the participating players in the turn of the instance of the game of poker, less the amount wagered by the winning player, less the amount of the rake. The logged information is recorded in the collusion detection database (20).

The stored program in the collusion detection server (14) provides a ranking facility (21) that is operable to derive from the logged playing history of each pair of players in an instance of the game, a corresponding tertiary statistic. The tertiary statistic is re-calculated by the ranking facility (21) each time the corresponding players' respective playing histories are updated with the outcome of a further turn of the game in which the players have participated. The derived tertiary statistic is stored in the collusion detection database (20). The tertiary statistic for each pair of players is a function of the cumulative wagers by each player in the pair in all turns of the game in which both players have wagered, and the cumulative outcomes of the wagers made by each player in these same turns of the game.

Figure 3:
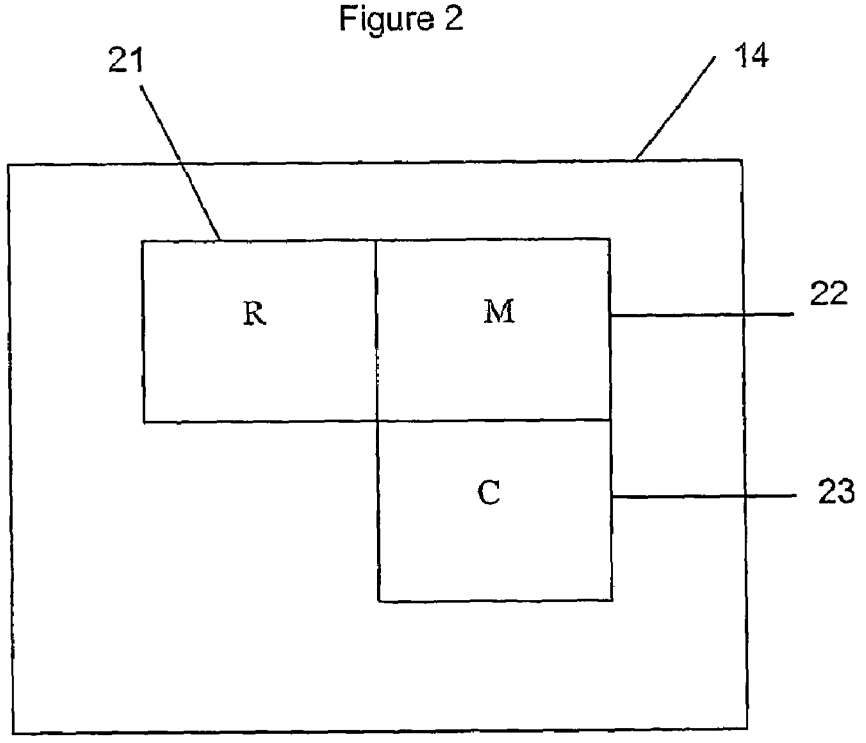
FIG. 3 is a functional representation of a stored software program of the collusion detection server (14) of FIG. 1.

Referring now to FIG. 3, the stored program in the collusion detection server (14) also provides a monitoring means (22) for continuously monitoring the tertiary statistic of any pair of players in the collusion detection database (20). The monitoring means (22) generates an output in the form of a flag when the tertiary statistic of any pair of players exceeds a threshold of 1,08. The applicant has found that such a situation indicates a change in the pattern of play of that pair of players, and that this may serve as a reliable indicator of possible collusion by that pair of players that is worthy of further investigation. In order to minimise the possibility of generating spurious flags, the ranking facility (21) derives the tertiary statistic for any pair of players only once a playing history exceeding 300 turns of the game has been logged in the collusion detection server (14).

The stored program in the collusion detection server (14) also provides a control facility (23) that acts on the flag generated by the monitoring means (22) by suspending the corresponding pair of players from further participation in the game of poker.

Where the variation of poker being played is either Five Card Stud or Seven Card Stud, the monitoring means (22) also monitors, on a continuous basis, a playing strategy of each participating player in the game. The monitoring means (22) generates a flag whenever a participating player calls a final wager in the game with a hand that does not outrank the exposed cards of any other participating player, that is when the player knows absolutely that he cannot win the game, yet proceeds to call a bet. Such a set of circumstances also indicates that a player may be colluding, and is worthy of further investigation.

It will be appreciated by those skilled in the art that the system (1) enables potentially fraudulent circumstances arising out of collusive play be any player to be flagged. The system (1) is then able to control the potential fraud by suspending the player from any further participation in the game. There exists a possibility, however, that such a player may have been flagged because his playing pattern arises not from collusive play, but rather from bad or unskilled play. In this instance, it is undesirable to suspend such a player from further participation in the game.

In order to prevent unwarranted suspension of non-colluding players, the system (1) may include a geo-location means (25). The geo-location means (25) is well known in the art and will not be described here in detail. Whenever a player accesses one of the online casino websites (3*a*, 3*b*) by means of the Internet, the player's Internet Protocol address is submitted by the corresponding casino web server (not shown) to the geo-location means (25), which returns to the casino web server a geographical location of the player. The geographical location of each participating player is passed to the collusion detection server (14) where it is stored in the collusion detection database (20) together with the player's playing history.

Knowledge of the geographical location of a player can reduce the instances of incorrect suspension of a suspected colluding player. For example, the control facility (23) may suspend any two or more players for whom the monitoring means (22) has generated flags and whose geographical locations are substantially identical. Alternatively, the control facility (23) may prevent any two or more players for whom the monitoring means (22) has generated outputs and whose geographical locations are substantially identical, from participating in the same instance of the game of poker.

Numerous modifications are possible to this embodiment without departing from the scope of the invention. In particular, the predetermined threshold at which the tertiary statistic is used to generate an output can be less than or greater than 1,08 to render the system (1) more or less sensitive, respectively, to the detection of potentially collusive play.

Further, the gaming server (2) may be directly accessible by all players through a single portal such as a poker room where poker is the only game available to would-be players, instead of through a plurality of different online casino websites (3*a*, 3*b*). In this variation of the embodiment the necessity for the clearing account facility (15) and the separate clearing account for each one of the casino websites fall away.

Still further, the control facility may be dispensed with, resulting in all instances of suspected collusion that are flagged requiring further investigation by a supervisor. The supervisor is then required to decide in each case whether a player is to be suspended from play, or not.

Yet further, the system (1) may be applied to any multi-player zero-sum game on which participating players may place wagers. Further examples of such games are backgammon, bridge, gin, rummy, canasta, whist or mah-jong.

The invention therefore provides a system and a method for detecting and controlling collusive play in multiplayer games.

The invention claimed is:

1. A system for detecting collusion in a game having a plurality of participating players, comprising:

means for recording, for each player, an amount wagered on each turn of the game in which the player participates, and a corresponding outcome of said wager, the outcome being a complete or partial forfeit of the wager if the wager is unsuccessful, and a profit made on the wager if the wager is successful;

a ranking facility operable to derive a tertiary statistic for each pair of participating players as a function of the cumulative wagers by each player in the pair in all turns of the game in which both players have wagered and the cumulative outcomes of the wagers made by each player in the same turns of the game, wherein the tertiary statistic is a ratio of the cumulative outcomes of the wagers of both players in a pair, and the cumulative amounts wagered by both players; and monitoring means for monitoring the tertiary statistic of each pair of players and generating an output when the tertiary statistic exceeds a predetermined threshold, the output being an indicator of possible collusion by the respective pair of players.

2. A system as claimed in claim 1 in which the predetermined threshold of the tertiary statistic is at least 1.08.

3. A system as claimed in claim 1 which includes a control facility operable to suspend both players in any pair of players for which the monitoring means has generated an output, from any further participation in the game.

4. A system as claimed in claim 3 that includes geo-location means for determining the geographical location of any participating player, the control facility being operable to suspend both players in any pair of players for which the monitoring facility has generated an output and whose geographic locations are substantially identical, from any further participation in the game.

5. A system as claimed in claim 4 in which the control facility is operable to prevent any pair of players for which the monitoring facility has generated an output and whose geographic locations are substantially identical, from participating in a same instance of the game.

6. A system as claimed in claim 1 in which the game is Five Card Stud poker or Seven Card Stud poker.

7. A system as claimed in claim 6 in which the monitoring means also monitors a playing strategy of each participating player in the game of Five Card Stud poker or Seven Card Stud poker, and generates an output for any player who calls a final bet in any turn of the game with a hand that does not outrank the exposed cards of any other participating player in that turn of the game.

8. A system as claimed in claim 1 which includes storage means capable of storing the tertiary statistic for each pair of participating players.

9. A method for detecting collusion in a game having a plurality of participating players, comprising the steps of:

recording, for each player, an amount wagered on each turn of the game in which the player participates, and a corresponding outcome of said wager, the outcome being a complete or partial forfeit of the wager if the wager is unsuccessful, and a profit made on the wager if the wager is successful;

a collusion detection server deriving a tertiary statistic for each pair of participating players, wherein the tertiary statistic for each pair of players is a ratio of the cumulative outcomes of all the wagers of both players and the cumulative amounts wagered by both players in all turns of the game in which both players have wagered; and the collusion detection server monitoring the tertiary statistic of each pair of players and generating an output when the tertiary statistic of any pair of players exceeds a predetermined threshold, the output being an indicator of possible collusion by the respective pair of players.

10. A method as claimed in claim 9 in which the predetermined threshold of the tertiary statistic is at least 1.08.

11. A method as claimed in claim 9 that includes the step of suspending any pair of players in any pair of players for which an output has been generated, from any further participation in the game.

12. A method as claimed in claim 9 that includes the steps of determining the geographic location of any participating player, and suspending both players in any pair of players for which an output has been generated and whose geographic locations are substantially identical, from further participation in the game.

13. A method as claimed in claim 12 that includes the step of preventing any pair of players for which an output has been generated and whose geographic locations are substantially identical, from participating in a same instance of the game.

14. A method as claimed in claim 9 in which the game is Five Card Stud poker or Seven Card Stud poker.

15. A method as claimed in claim 14 that includes the further step of monitoring a playing strategy of each participating player in the game of Five Card Stud poker or Seven Card Stud poker, and generating an output for any participating player who calls a final bet in any turn of the game with a hand that does not outrank the exposed cards of any other participating player.

16. A method as claimed in claim 9 that includes the step of storing the tertiary statistic for each pair of participating players in a database.

* * * * *